（12）United States Patent
Hoeven

(10) Patent No.: US 6,765,858 B2
(45) Date of Patent: Jul. 20, 2004

(54) ARRANGEMENT FOR READING AN INFORMATION CARRIER

(75) Inventor: Petrus Christianus Johannes Hoeven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 453 days.

(21) Appl. No.: 09/836,086

(22) Filed: Apr. 17, 2001

(65) Prior Publication Data

US 2002/0039344 A1 Apr. 4, 2002

(30) Foreign Application Priority Data

Aug. 28, 2000 (EP) ............................................ 00202985

(51) Int. Cl.⁷ ................................................ G11B 7/00
(52) U.S. Cl. ................................................ 369/124.12
(58) Field of Search ........................... 369/44.35, 44.36, 369/44.41, 44.42, 47.16, 47.2, 59.21, 59.27, 124.02, 124.09, 124.12; 326/83, 27, 30; 324/609, 713; 375/220, 257, 609

(56) References Cited

U.S. PATENT DOCUMENTS 4,556,983 A      12/1985   Heitmann et al. ............. 375/60
5,103,439 A  *   4/1992    Bierhoff et al. ........... 369/44.35
6,448,813 B2 *   9/2002    Garlepp et al. ................ 326/83
6,573,730 B2 *   6/2003    Mita et al. .................... 324/609
6,597,731 B1 *   7/2003    Shuholm ..................... 375/220

FOREIGN PATENT DOCUMENTS

EP          0759614 A2       2/1997

OTHER PUBLICATIONS

Nemec J Et Al., "Take The Mystery Out Of AC Termination," Electronic Design, Penton Publishing, Cleveland, OH, Sep. 2, 1997, pp. 136, 138, 140, 142, 146, & 148.

* cited by examiner

Primary Examiner—Thang V. Tran
(74) Attorney, Agent, or Firm—Michael Belk

(57) ABSTRACT

The invention relates to an arrangement for reading an information carrier (2). The arrangement comprises a read head (4) for scanning the information carrier along a scanning path. The read head thus generates one or more electric signals ($V_A$, $V_B$, $V_C$, $V_D$) in response to a physical pattern recorded along the scanning path. The arrangement comprises one or more electrical conductors (6.2, 6.3, 6.4, 6.5, 6.6) for conveying these signals to a signal processing unit (8). The electrical conductors include one or more signal conductors (6.2, 6.3, 6.5, 6.6) and at least one reference conductor (6.4). The one or more signal conductors (6.2, 6.3, 6.5, 6.6) are coupled to the at least one reference conductor (6.4) via a resistive impedance (R1, R2, R3, R4) and a capacitive impedance (C), which are connected in series.

5 Claims, 4 Drawing Sheets

ARRANGEMENT FOR READING AN INFORMATION CARRIER

Figure 1:
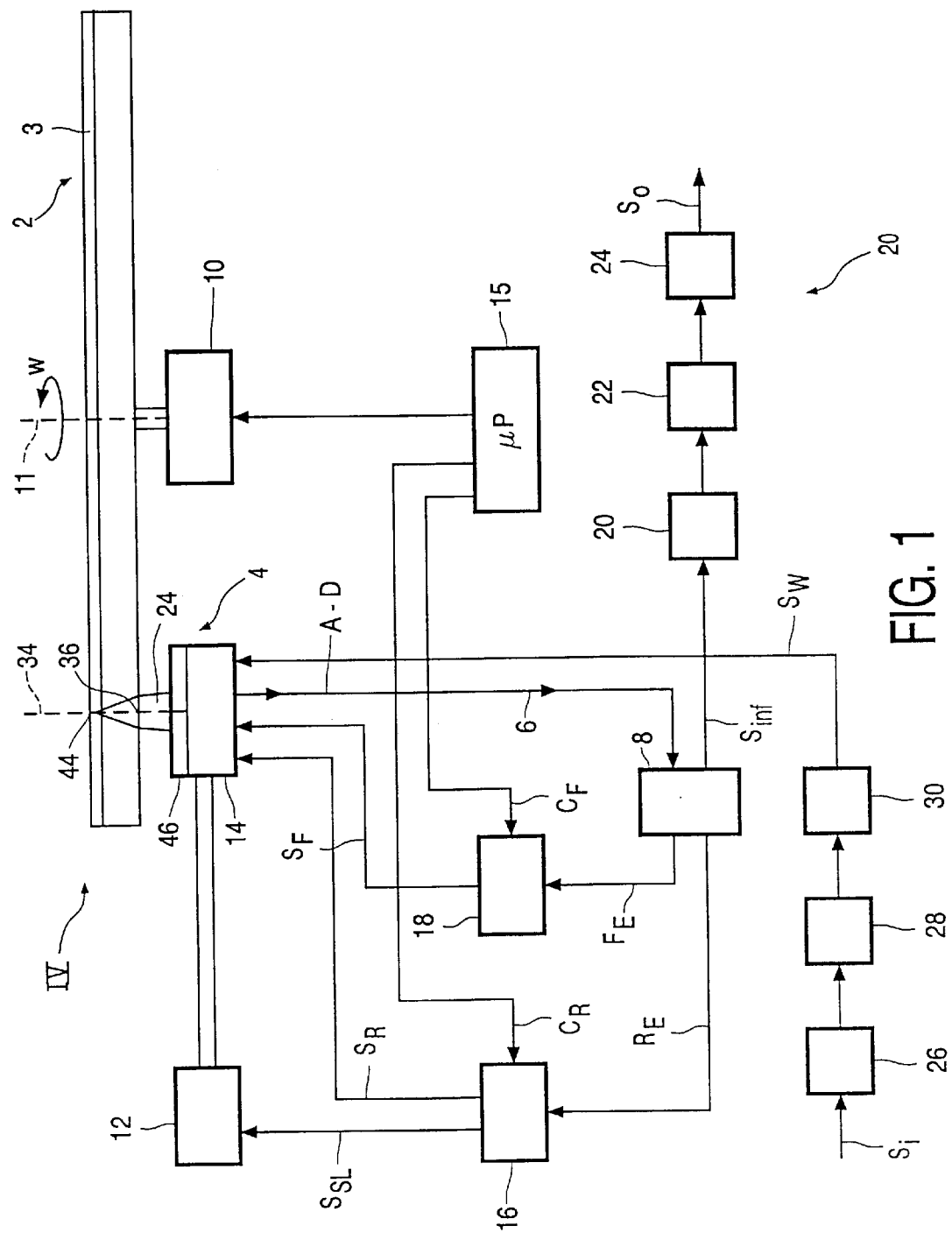

The invention relates to a arrangement for reading an information carrier, including a read head for scanning the information carrier along a scanning path and thus generating one or more electric signals in response to a physical pattern recorded along the scanning path, electrical conductors for conveying the one or more electric signals to a signal processing unit.

Such an arrangement is described in U.S. Pat. No. 5,103,439. The arrangement disclosed therein is suitable for reading an optical information carrier. The read head has a radiation source for the generation of radiation, means for imaging the radiation onto a scanning spot on the information carrier and for imaging radiation that leaves the scanning spot onto a detector. The detector has a first to fourth sub-detector and a current-voltage converter for the generation of voltage signals in response to current signals generated by the sub-detectors. In practical versions of the known arrangement the transimpedance amplifier is coupled to a signal processing unit via a flexible cable. From the signals supplied by the current-voltage converter this unit derives an information signal, as well as error signals for servo systems for the control of the position of the read head and of the focusing of the scanning spot.

At high read speeds, for example 10 to 20×DVD, disturbing reflections may appear at the input of the signal processing unit, as a result of which the signals conveyed via the flexible cable are unreliable. The reflections can be counteracted by terminating the respective conductors of the flexible cable with a resistive impedance near the input of the signal processing unit. However, this gives rise to a substantial increase of the load of the current-voltage converter.

It is an object of the invention to provide an arrangement of the type defined in the opening paragraph, which is suitable for comparatively high reading speeds and in which the load of the current-voltage converter is yet limited.

To this end, the arrangement in accordance with the invention is characterized in that the electrical conductors include one or more signal conductors and at least one reference conductor, the one or more signal conductors being coupled, near the signal processing unit, to the at least one reference conductor via a series connection of a resistive impedance and a capacitive impedance.

In an arrangement for reading an optical information carrier the signals generated by the current-voltage converter have both low-frequency components and high-frequency components. The first-mentioned components are of importance for the servo systems for radial and axial control. The last-mentioned components are indicative of the information read from the information carrier.

In the arrangement in accordance with the invention the impedance formed by the series connection of the resistive and the capacitive impedance is comparatively low at high frequencies. On the one hand, this results in a correct termination for the high-frequency components. On the other hand, the series connection has a comparatively high impedance for the low-frequency components, as a result of which the load of the current-voltage converter is limited.

An attractive embodiment of the arrangement in accordance with the invention has the characteristic feature defined in claim 2. In practice, the signals from the read head are transferred to the signal processing unit with the aid of various signal conductors. The inventor has found that it is possible to use a common capacitive impedance without any appreciable loss in signal quality. This enables the number of component parts to be reduced.

A practical embodiment of the arrangement in accordance with the invention is characterized as defined in claim 3. The read head generally includes a preamplifier, for example in the form of a transimpedance amplifier, also referred to herein as current-voltage converter. In the embodiment defined in claim 3, each signal conductor is disposed adjacent an auxiliary conductor, which itself does not conduct a signal. This limits electromagnetic interference.

This embodiment is particularly favorable in the variant defined in claim 4. In this variant of the detector a radial error signal can be derived by means of the DPD method. In said method the signals corresponding to the first and the third sub-detector are added to one another. Then, it is not a problem if there is crosstalk between these signals in the cable with the conductors. The same applies to the signals from the second and the fourth sub-detector.

Figure 2:
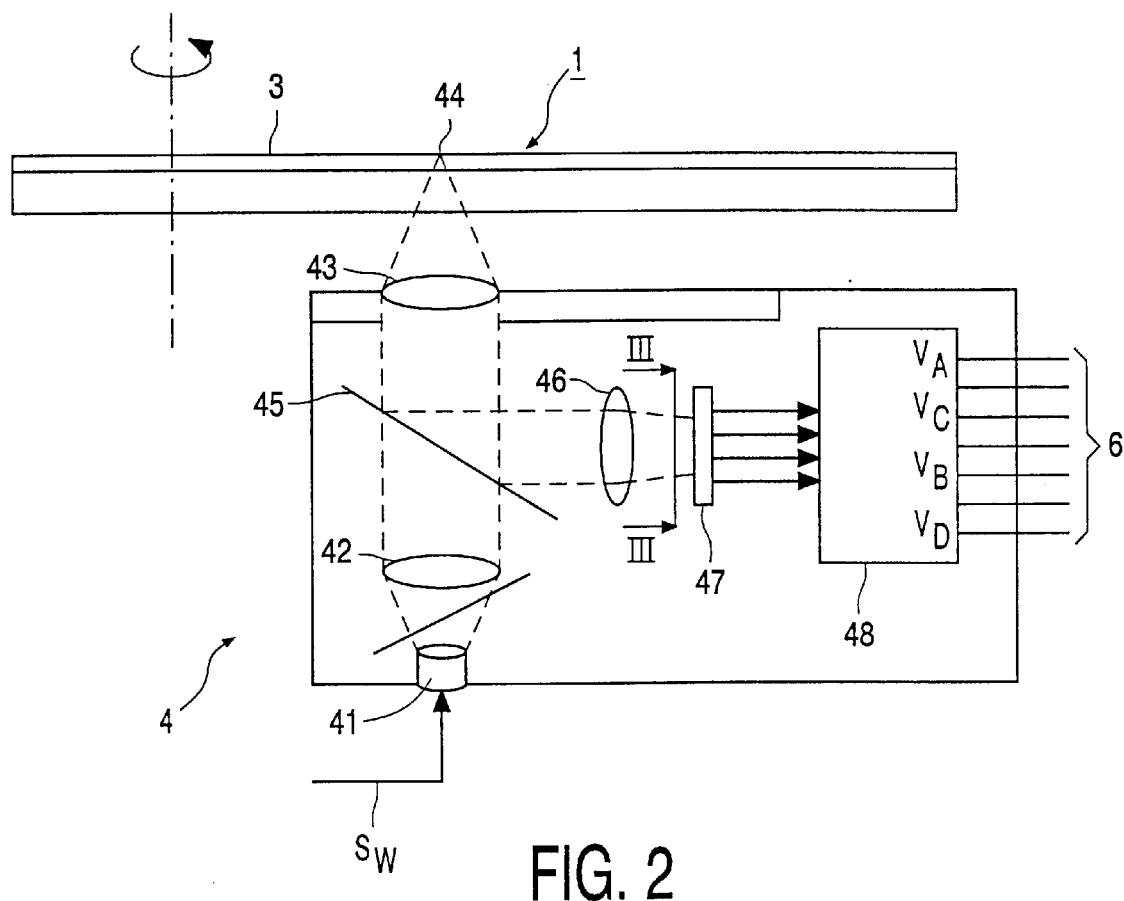
Figure 3:
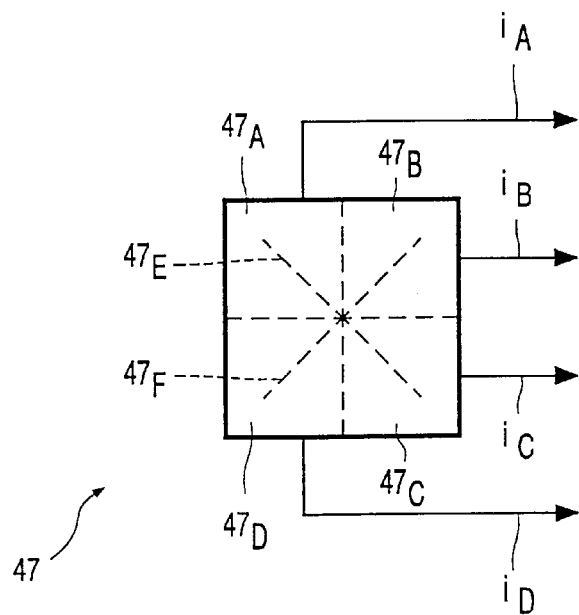

These and other aspects of the invention will be described in more detail with reference to the drawings. In the drawings FIG. 1 shows an example of an arrangement in accordance with the invention, FIG. 2 shows a part of the arrangement shown in FIG. 1, FIG. 3 shows a detail of said part at III—III in FIG. 2, FIG. 4 shows other parts of the arrangement of FIG. 1 in greater detail, FIG. 5A shows a signal measured in an arrangement not in accordance with the invention, and FIG. 5B shows a signal measured in an arrangement in accordance with the invention.

FIG. 1 shows an arrangement for reading an information carrier 2. In the present case, the arrangement is adapted to read an optical information carrier 2. The arrangement shown includes a read head 4 for scanning the information carrier 2 along a scanning path and thus generating one or more electric signals A–D in response to a physical pattern recorded along the scanning path. The scanning paths of optical information carriers generally take the form of tracks which extend substantially concentrically around the center of the information carrier 2. The tracks may form, for example, concentric circles around the center or may together form a spiral whose center coincides with said center of the information carrier. As an alternative, the information carrier may take the form of a card, the tracks being provided on a strip and extending in the longitudinal direction of the strip.

An example of the read head 4 will be described in more detail with reference to FIG. 2 and FIG. 3. The read head of FIG. 2 has a radiation source 41 for the generation of radiation. The read head 4 further has imaging means 42, 43 for imaging the radiation onto the information carrier 2 as a scanning spot 44. The read head 4 further includes imaging means 43, 45, 46 for imaging radiation that leaves the scanning spot 44 onto an optical detector 47. Said imaging means may include, for example, lenses, prisms, lattices, mirrors etc. In the present example, the imaging means comprise a convergent lens 42 and a focusing objective 43 to image the radiation beam generated by the radiation source 41 as a scanning spot. Furthermore, a semitransparent mirror 45 is interposed between the convergent lens 42 and the focusing objective 43. Radiation which is reflected from the scanning spot 44 is imaged onto an optical detector 47 via the focusing objective 43, the semitransparent mirror 45 and an astigmatic element 46. The optical detector 47, shown in more detail in FIG. 3, comprises four sub-detectors $47_A$, $47_B$, $47_C$ and $47_D$. The four sub-detectors $47_{A-D}$ each generate a current signal $i_A$, $i_B$, $i_C$, $i_D$ which is indicative of an intensity of the radiation that is incident on the relevant sub-detector. A current-voltage converter 48 converts the current signals $i_{A-D}$ into voltage signals $V_{A-D}$. The arrangement further includes electrical conductors 6 for transferring the one or more electric signals $V_{A-D}$ to a signal processing unit 8.

Figure 4:
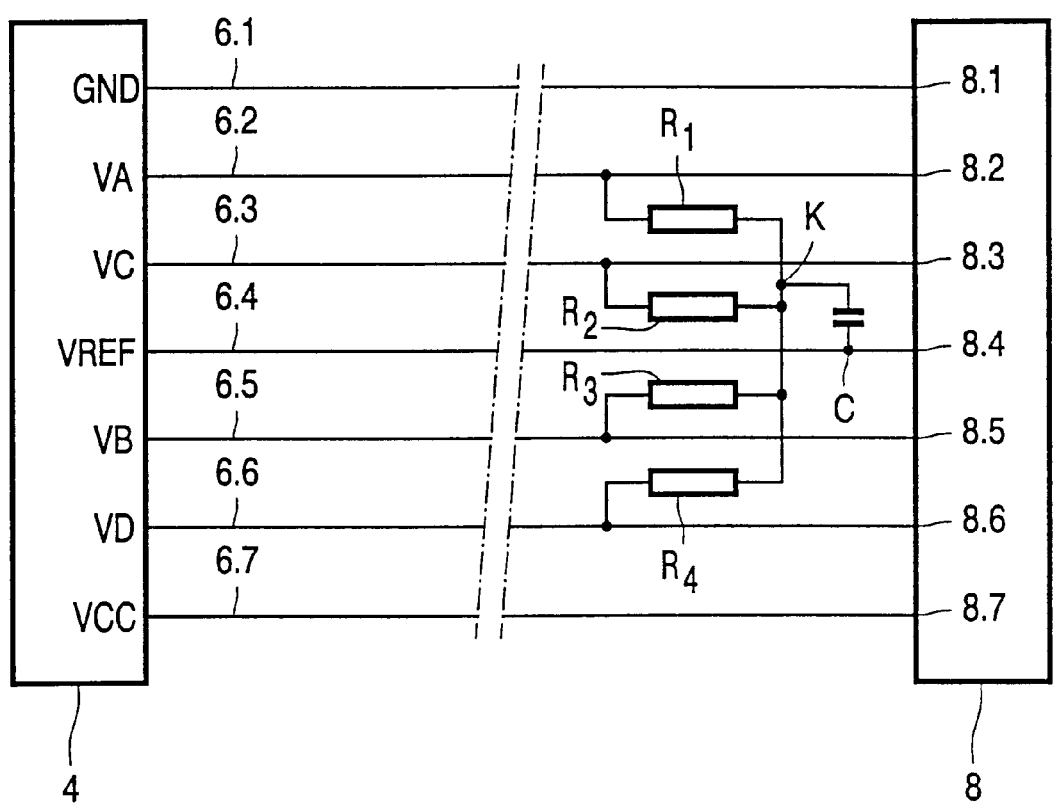
Figure 5A:
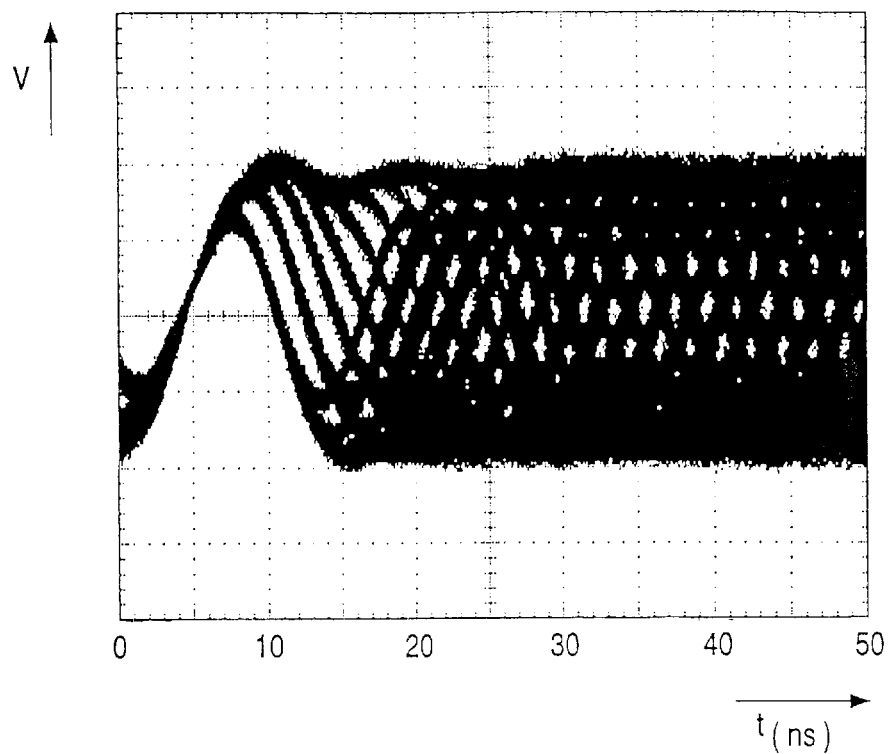
Figure 5B:
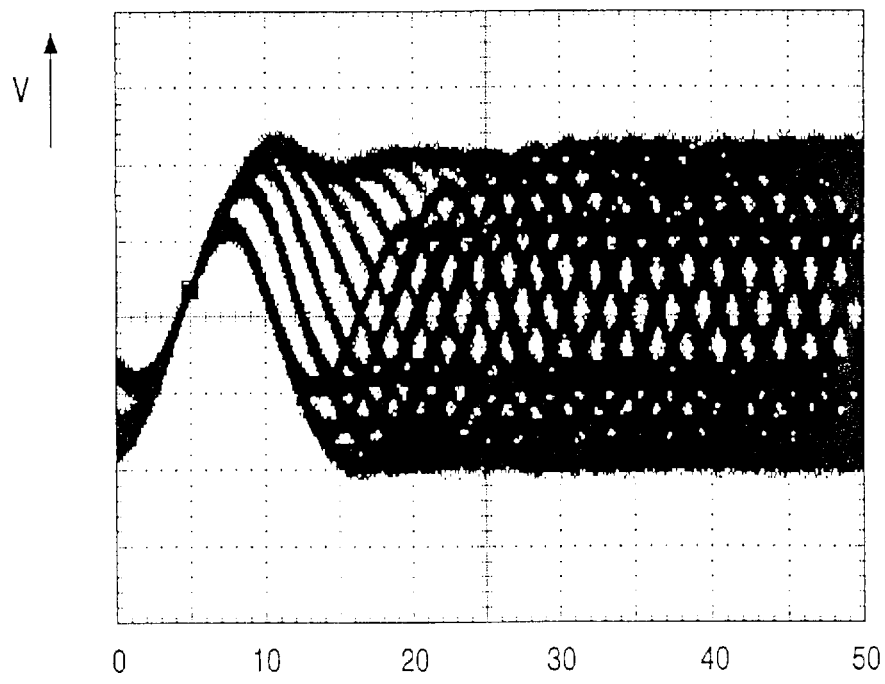

FIG. 4 shows the electrical conductors 6 in more detail. The electrical conductors include one or more signal conductors, in the present case the four signal conductors 6.2., 6.3, 6.5 and 6.6. The electrical conductors further include a reference conductor 6.4. Near the signal processing unit 8 the four signal conductors 6.2, 6.3, 6.5 and 6.6 are coupled to the reference conductor 6.4 via a series connection of a resistive impedance $R_1$, $R_2$, $R_3$, $R_4$ and a capacitive impedance C.

The four signal conductors 6.2, 6.3, 6.5 and 6.6 are each connected to a node K via a resistive impedance $R_1$, $R_2$, $R_3$, $R_4$, respectively, which node is connected to the reference conductor 6.4 via a common capacitive impedance C. However, it is also conceivable that the four signal conductors 6.2, 6.3, 6.5 and 6.6 are each connected to the reference conductor 6.4 via a separate series connection of a resistive impedance and a capacitive impedance.

In the embodiment shown the arrangement has, in addition to the four signal conductors 6.2, 6.3, 6.5 and 6.6, a first to a third auxiliary conductor. The auxiliary conductors include the reference conductor 6.4 for the four signal conductors 6.2, 6.3, 6.5 and 6.6 and a first supply line 6.1 and a second supply line 6.7. The first supply line 6.1 and the second supply line 6.7 supply the supply voltages GND and VCC, respectively. The conductors 6.1–6.7 take the form of a flat flexible cable, a first pair of signal conductors 6.2, 6.3 extending between a first and a second auxiliary conductor 6.1 and 6.4. A second pair of signal conductors 6.5, 6.6 extends between the second and the third auxiliary conductor 6.4 and 6.7. Each of the conductors is connected to a respective input 8.1–8.7 of the signal processing unit 8.

The first pair of signal conductors 6.2, 6.3 serves to convey the signals $V_A$, $V_B$ which correspond to the first sub-detector $47_A$ and the third sub-detector $47_C$. The second pair of signal conductors 6.5, 6.6 serves to convey the signals $V_B$, $V_D$ which correspond to the second sub-detector $47_B$ and the fourth sub-detector $47_D$.

In the present detector 47 the sub-detectors $47_{A-D}$ are arranged in such a manner that an imaginary line $47_E$ from the first sub-detector $47_A$ to the third sub-detector $47_C$ intersects an imaginary line $47_F$ from the second sub-detector $47_B$ to the fourth sub-detector $47_D$. In practice, the flat cable 6 has a length of 5 to 20 cm, for example 20 cm, and the resistive impedances R1–R4 have a resistive value of 100 to 1000Ω, for example 200Ω. The capacitive value of the capacitive impedance C depends on the frequency range of the signals to be transferred via the signal conductors. Preferably, the capacitive value is selected in such a manner that $$f_{servo} < f_{RC} < f_{sign},$$

where $f_{servo}$ is the bandwidth for the servo signals, $$f_{RC} = \frac{1}{2\pi RC},$$

where R is the effective resistance, $f_{sign}$ is the frequency above which a signal transfer takes place.

The effective resistance in the above embodiment complies with:

$$R = R_A + R_1 // R_B + R_3 // R_C + R_2 // R_D + R_4$$

$R_A$, $R_B$, $R_C$ and $R_D$ are the output impedances of the outputs for the signals $V_{A-D}$. The output impedances have values of, for example 40Ω.

In a practical embodiment where $R_1 = R_2 = R_3 = R_4 = 200\Omega$ this means that R=60Ω. Practical values for $f_{servo}$ and $f_{sign}$ are 100 kHz and 500 kHz, respectively, as a result of which a favorable value for $f_{RC}$ is 200 kHz. From these values it follows that:

C≈10 nF.

To scan the information carrier 2 the arrangement has means for bringing about a relative movement of the scanning spot 44 with respect to the information carrier 2. The means include tangential positioning means 10 and radial positioning means 12, 14. The tangential positioning means are formed by a motor 10 for rotating the information carrier 2 about an axis 11. The motor is controlled by a microprocessor 15. The radial positioning means 12, 14 comprise coarse and fine positioning means. In the present case, the coarse positioning means are constructed as a slide 14 which is movable by means of a motor 12. The fine radial positioning means are adapted to move the scanning spot 44 with respect to the read head. The last-mentioned means are not shown herein for the sake of clarity. The coarse and the fine radial positioning means are controlled by control signals $S_{SL}$ and $S_R$ from a radial servo system. For this purpose, the radial servo system 16 receives a radial error signal $R_E$ from the signal processing unit 8 and a control signal $C_R$ from the microprocessor 15. The arrangement further has an axial servo system 18 for focusing the scanning spot 44 onto a plane of the information carrier 2. For this purpose, the axial servo system 18 generates a control signal $S_F$ in response to a focus error signal $F_E$ from the signal processing unit 18 and a control signal $C_F$ from the microprocessor 15.

The signal processing unit 8 further generates an analog information signal $S_{inf}$ from the voltage signals $V_A - V_D$. From this information signal a detector 20, for example a Viterbi detector or a threshold detector, generates a binary signal. From this signal a channel decoding unit 22 and an error correction decoding unit consecutively generate an output signal $S_o$. which is a reconstruction of the information recorded on the information carrier 2.

The disclosed arrangement is also suitable for writing information onto an information carrier. For this purpose, the arrangement includes an error correction encoding unit 26 and a channel encoding unit 28. The error correction code is for example CIRC. The channel code is for example EFM. The signal generated by the channel encoding unit 28 is supplied to a write strategy generator 30. In response thereto, this generator generates a write signal $S_W$, by means of which the radiation source 41 is controlled.

In order to verify the effect of the measure in accordance with the invention the eye pattern was determined of the sum of the signals on the inputs 8.2., 8.3, 8.5 and 8.6 of the signal processing unit in the arrangement in accordance with the invention. The eye pattern is shown in FIG. 5B. For comparison a corresponding eye pattern was determined for an arrangement not in accordance with the invention. This eye pattern is shown in FIG. 5A. The last-mentioned arrangement differs from the arrangement in accordance with the invention in that the network formed by the resistive impedances $R_1$, $R_2$, $R_3$, $R_4$ and the capacitive impedance C is absent. FIGS. 5A and 5B show that the measure in accordance with the invention distinctly improves the perceptibility of the eye pattern. Consequently, the detectability of the signal $V_A + V_B + V_C + V_D$ transferred via the signal conductors has also improved.

The invention is not limited to the embodiment described herein. Within the scope of the claims many variants are conceivable to one skilled in the art. In another embodiment the arrangement is adapted to read, for example, optical maps. In that case, the arrangement has, for example, a first and a second linear motor, the first linear motor moving the head in a first direction and the second linear motor moving the information carrier in a second direction perpendicular thereto. Yet another variant of the arrangement in accordance with the invention is adapted to read, for example, information carriers in the form of a tape. In that case, the arrangement has, for example, a first drive means for moving the tape in a longitudinal direction and second positioning means for moving the read head in a direction perpendicular thereto. It is obvious that the information carrier need not be based on an optical medium but may alternatively include a magnetic or a magneto-optical medium.

What is claimed is:

1. Apparatus for reading an information carrier, including a read head for scanning the information carrier along a scanning path and thus generating one or more electric signals in response to a physical pattern recorded along the scanning path, electrical conductors for conveying the one or more electric signals to a signal processing unit, the electrical conductors include one or more signal conductors and at least one reference conductor, the one or more signal conductors being coupled, near the signal processing unit, to the at least one reference conductor via a series connection of a resistive impedance and a capacitive impedance.

2. The apparatus as claimed in claim 1, characterized in that two or more signal conductors, which signal conductors are each connected to a node via a resistive impedance, which node is connected to the reference conductor via a common capacitive impedance.

3. The apparatus as claimed in claim 1, characterized in that the electrical conductors include a first to fourth signal conductor, a first to a third auxiliary conductor, which auxiliary conductors include the reference conductor for the four signal conductors and a first supply line and a second supply line, the conductors taking the form of a flat cable, a first pair of signal conductors extending between a first and a second auxiliary conductor and a second pair of signal conductors extending between the second and the third auxiliary conductor.

4. The apparatus as claimed in claim 3, characterized in that the read head comprises a detector having a first to a fourth four sub-detector, an imaginary line from the first sub-detector to the third sub-detector intersecting an imaginary line from the second sub-detector to the fourth sub-detector, wherein the first pair of signal conductors for conveying the signals which correspond to the first sub-detector and the third sub-detector and having the second pair of signal conductors for conveying the signals which correspond to the second sub-detector and the fourth sub-detector.

5. The apparatus as claimed in claim 2, characterized in that the electrical conductors include a first to fourth signal conductor, a first to a third auxiliary conductor, which auxiliary conductors include the reference conductor for the four signal conductors and a first supply line and a second supply line, the conductors taking the form of a flat cable, a first pair of signal conductors extending between a first and a second auxiliary conductor and a second pair of signal conductors extending between the second and the third auxiliary conductor.

* * * * *